United States Patent Office 3,526,593
Patented Sept. 1, 1970

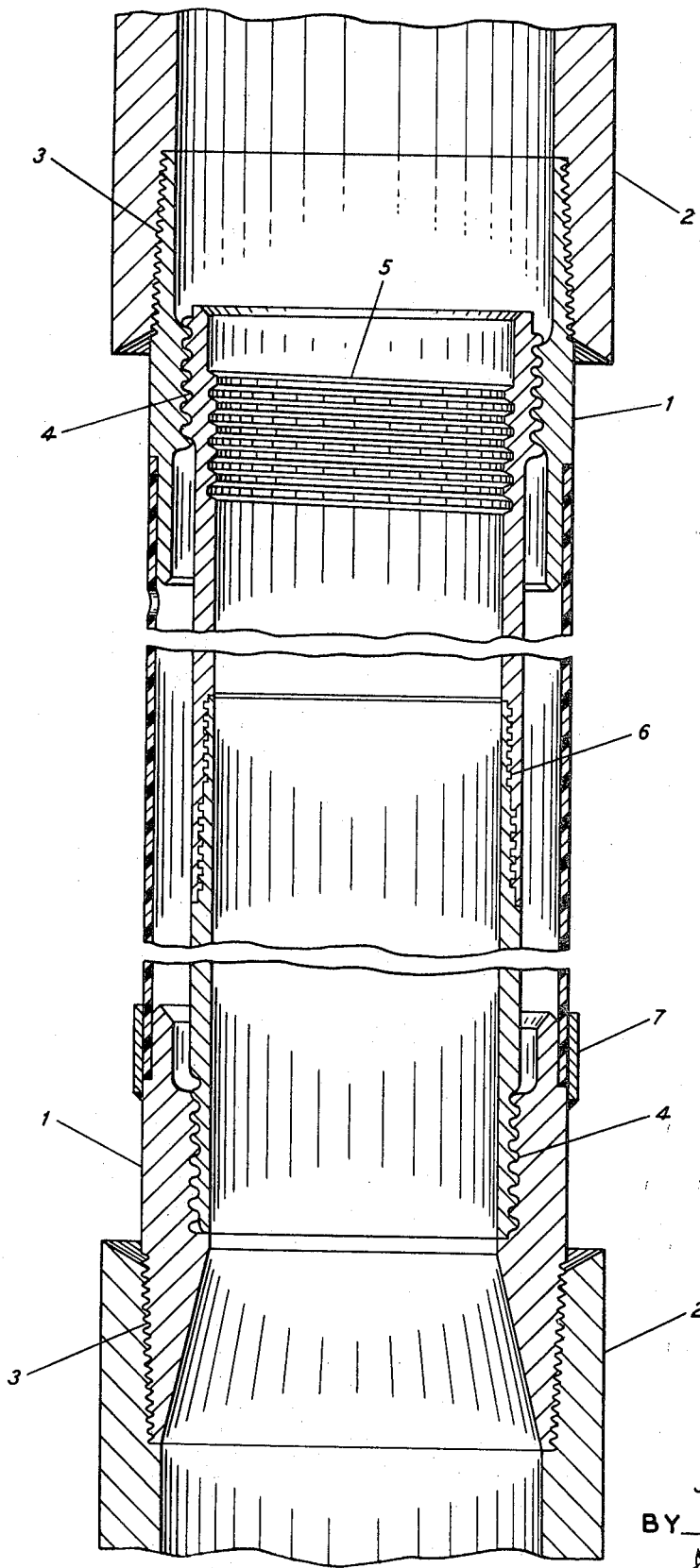

3,526,593
PIPE THREAD SEALANT CONTAINING
POLYTETRAFLUOROETHYLENE
John E. Oliver, Jr., Lafayette, La., assignor to Chevron Research Corporation, a corporation of Delaware
Continuation of application Ser. No. 335,137, Jan. 2, 1964. This application Dec. 15, 1967, Ser. No. 691,062
Int. Cl. C10m 5/16, 5/02
U.S. Cl. 252—23
4 Claims

ABSTRACT OF THE DISCLOSURE

Pipe thread sealant and lubricant consisting of 33–80% of ground polytetrafluoroethylene resin, 0.5–10% calcium salt of fatty acid containing 10–22 carbon atoms, 1–10% of calcium acetate and calcium carbonate combined, 0.1–5% calcium hydroxide, and the remainder being mineral oil of lubricating viscosity.

---

This application is a streamlined continuation of application Ser. No. 335,137 filed Jan. 2, 1964 and now abandoned.

This invention relates to a novel pipe thread dope. More particularly, it concerns a new pipe thread dope composition possessing excellent sealing and lubricating characteristics in the formation of threaded pipe connections and other joints subject to high pressures.

In the production of oil and gas from high pressure wells and also in the drilling of wells where high pressures are encountered, it is important that the threaded joints of drill pipe, tubing and the like be effectively sealed to prevent leakage. This is also the case in other operations involving the handling and processing of gases and fluids under high pressure conditions, such as those encountered in petroleum refining and like manufacturing procedures.

It has now been found that an effective high pressure pipe thread dope is provided in the composition consisting essentially of an oil of lubricating viscosity, from about 0.5 to 10% by weight of a calcium salt of a fatty acid containing from 10 to 22 carbon atoms, from about 1 to 10% by weight of calcium acetate, from about 0.1 to 5% by weight of base expressed as calcium hydroxide, and from about 33 to 80% by weight of ground polytetrafluoroethylene resin having an average particle diameter of from about 0.005 to 0.05 inch.

In accordance with the present discovery, there is also provided an effectively sealed high pressure pipe thread joint comprising two mating threaded elements having disposed therebetween a high pressure seal consisting essentially of an oil of lubricating viscosity, from about 0.5 to 10% by weight of a calcium salt of a fatty acid containing from 10 to 22 carbon atoms, from about 1 to 10% by weight of calcium acetate, from about 0.1 to 5% by weight of base expressed as calcium hydroxide, and from about 33 to 80% by weight of ground polytetrafluoroethylene resin having an average particle diameter of from about 0.005 to 0.05 inch.

The novel pipe thread dope of the present invention in use in threaded joints or connections gives an effective seal and prevents leakage at pressures as high as 15,000 lbs. per square inch or more. The use of the pipe thread dope in threaded joints or connections also serves as a lubricant which permits such joints or connections to be made up or separated without the disadvantages of freezing, galling or stripping of threads often encountered when pipes are assembled or disassembled in high pressure drilling and producing operations.

The calcium salts of fatty acids containing from 10 to 22 carbon atoms are thickening agents which provide a grease-like consistency to the oil of lubricating viscosity. Such thickening agents are exemplified by the calcium salts of capric acid, lauric acid, myristic acid, palmitic acid, oleic acid, stearic acid, 12-hydroxystearic acid, hydrogenated ricinoleic acid, arachidic acid, behenic acid, etc. The salts of fatty acids containing from 10 to 22 carbon atoms are present in amounts sufficient to thicken the pipe thread dope to the desired consistency and provide a suitable lubricant base. For present purposes amounts of about 0.5 to 10% by weight, and preferably from about 1 to 5% by weight, are employed.

Calcium acetate is present in the pipe thread compositions of the invention in amounts from about 1 to 10%, and preferably from about 2.5 to 8%, by weight.

In a preferred embodiment, the compositions of the invention contain calcium carbonate. This may be added directly as calcium carbonate, or it may be prepared in situ by the reaction of urea with calcium hydroxide during the preparation of the lubricant base composition. A stoichiometric amount of urea is employed based on the formation of calcium carbonate by reaction of 1 mole urea with 1 mole calcium hydroxide.

When calcium carbonate is present in the composition, the maximum amount is controlled so that the weight ratio of calcium carbonate to calcium acetate is from about 3:1 to 1:1. However, the sum of the total amount of calcium acetate and calcium carbonate does not exceed the amount already specified for calcium acetate alone. It is important that the mole ratio of the total amount of calcium acetate and calcium carbonate to the amount of calcium salts of fatty acids from 10 to 22 carbon atoms be in the range from about 5:1 to about 40:1, and preferably from about 8:1 to 15:1.

In a particular embodiment of the present invention, the lubricant base composition of the pipe thread dope is a hydrous calcium complex grease composition which has been described in detail in Dreher U.S. patent application Ser. No. 771,186, filed Nov. 3, 1958, now abandoned, of which Dreher continuation U.S. application Ser. No. 275,211 was filed April 24, 1963, issued as U.S. Pat. No. 3,186,944 on June 1, 1965. As described in those applications, such lubricant base compositions are obtained by blending of an oil of lubricating viscosity, a calcium salt of 12-hydroxystearic acid in amounts sufficient to thicken the oil to the consistency of the grease, calcium acetate in amounts of about 2 to 5 moles for each mole of calcium 12-hydroxystearate, excess base expressed as calcium hydroxide, and calcium carbonate which is obtained by reacting urea with calcium hydroxide. Such grease compositions are preferably hydrous and contain at least 0.1% by weight of water.

The ground polytetrafluoroethylene resin of the pipe thread dope composition is a particulate free-flowing material having an average particle diameter of from about 0.005 to 0.05 inch, and preferably from about 0.01 to 0.03 inch. Suitable polytetrafluoroethylene resins for this purpose are commercial materials marketed by Du Pont under the trade name "Teflon." The polytetrafluoroethylene resins are described in detail in the "Condensed Chemical Dictionary" published 1961 by the Reinhold Publishing Corporation, New York, N.Y., under the headings "Polytetrafluoroethylene" and "Teflon."

The ground polytetrafluoroethylene resin is present in the thread dope composition in amounts from about 33 to 80% by weight. For present purposes, the most effective high pressure seals are obtained with proportions of from about 33 to 70%, and preferably from about 45 to 60%, by weight. When the amount of ground polytetrafluoroethylene is too low, it is found that leaks may develop upon fluctuations of pressures. When the amounts of polytetrafluoroethylene are too large, a creeping extrusion of sealant occurs upon repeated cycles of pressure fluctuations which ultimately results in critical loss of pipe thread dope and fouling of pipe fitting machinery.

Lubricating oils which are suitable as base oils for the pipe thread dope compositions of this invention include a wide variety, such as naphthenic base, paraffin base, and mixed base mineral lubricating oils; and synthetic oils, such as polymers of propylene, butylene, etc., propylene oxide polymers, dicarboxylic acid esters, such as those which are prepared by esterifying azelaic acid with 2-ethylhexyl alcohol and silicon esters, such as tetraethyl silicate, hexa(4-methyl-2-pentoxy)-disiloxane, etc.

The pipe thread dope compositions may also contain other additives, including "basic lead carbonate" of the formula $$2PbCO_3 \cdot Pb(OH)_2$$

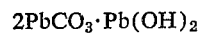

This lead carbonate is well known as "white lead" to the paint industry. It is used in pipe thread compositions in amounts of from about 3 to 15% by weight, and preferably from about 3 to 7% by weight. Powdered graphite may also be used in amounts of from about 10 to 50% by weight, preferably from about 25 to 30% by weight.

The following examples illustrate the preparation of pipe thread dope compositions in accordance with this invention. Unless otherwise specified, the proportions given are on a weight basis.

EXAMPLE 1

A lubricant base composition of commercial scale was prepared in this example by mixing 1152 lbs. (7.2%) methyl 12-hydroxystearate with 1200 lbs. (7.5%) of California solvent refined paraffinic base oil having a viscosity of 480 SSU at 100° F. The mixture was heated to about 130° F. 2192 lbs. (13.7%) of hydrated lime was then added with mixing, along with 3050 lbs. (19.2%) of the paraffinic base oil. With the temperature of the mixture at about 120° F., 1168 lbs. (7.3%) of acetic acid was added at a rate of about 12 lbs. per minute, followed by another 1200 lb. (7.5%) quantity of the paraffinic base oil. Next, 16 lbs. (0.1%) of sodium hydroxide was added, followed by 320 lbs. (2.0%) of urea. The mixture was then heated at a temperature of about 300–325° F. under a pressure of about 100 to 120 lbs./sq. in. for one hour with mixing. To the mixture was then added 112 lbs. (0.7%) of an aromatic amine oxidation inhibitor and a dye to color the mixture. The mixture was dehydrated by heating for one hour at about 300–325° F. 3800 lbs. (24.0%) of the paraffinic base oil was added and the mixture cooled to about 250° F. The mixture was then cooled to about 200° F., and 48 lbs. (0.3%) of an oxyethylated amine rust inhibitor along with about 1680 lbs. (10.5%) of paraffin base oil was added to the mixture.

EXAMPLE 2

A pipe thread dope was prepared by charging 328 lbs. of the lubricant base composition of Example 1 to a mixer. To the lubricant base composition was then added 328 lbs. of ground polytetrafluoroethylene resin having an average particle size in the range from 0.009 to 0.018 inch diameter (Teflon F–605 Grade 000, obtained from John L. Dore Company, Houston, Tex.). The lubricant base composition and ground polytetrafluoroethylene resin was then blended thoroughly and diluted with about 40 lbs. of a California solvent refined paraffinic base oil having a viscosity of 360 SSU at 100° F. The resultant blend was milled through a Charlotte mill. The work penetration of the product was 302. Following this, 60 lbs. of additional paraffinic base oil was added, and the product than had a work penetration of 325.

EXAMPLE 3

In another preparation, a lubricant base composition was prepared by mixing about 1150 lbs. of methyl 12-hydroxystearate and about 5000 lbs. of a California solvent refined paraffinic base oil having a viscosity of 480 SSU at 100° F. The mixture was heated to a temperature of about 130° F., and about 2190 lbs. of hydrated lime was added with mixing for a sufficient time to form a smooth homogeneous composition. The mixture was then heated to about 100° F. for about 30 minutes, and then about 1170 lbs. of acetic acid was added slowly over a period of about 30 to 45 minutes. To the mixture was then added about 1100 lbs. of the paraffinic base oil, followed by about 320 lbs. of urea. The composition was then heated to about 320° F. at a pressure of about 70–90 lbs./sq. in. for a period of about one hour. Following this, the mixture was heated at about 330° F. at atmospheric pressure for one hour, and an additional 5000 lb. portion of the paraffinic base oil was added.

EXAMPLE 4

This example illustrates the preparation of the pipe thread dope employing a lubricant base composition prepared according to Example 3. In a mixer there was charged 750 g. of lubricant base composition. To this was added 750 g. of ground polytetrafluoroethylene resin having a particle size ranging from 0.009 to 0.018 inch diameter (Teflon F–605 Grade 000, obtained from John L. Dore Company, Houston, Tex.). The two components were blended by mixing. A 100 g. portion of a California solvent refined paraffinic base lubricating oil having a viscosity of 360 SSU at 100° F. was then added. The mixture was stirred until homogeneous. The worked penetration of the product was 338.

As illustrated by the above examples, the compositions of this invention are prepared in accordance with conventional grease manufacturing procedures well known to the art, and the order of addition of the components is in general not critical. The calcium salt of fatty acid and base oil are blended with heating to obtain a uniform dispersion, and then acetic acid and excess base may be added. In the preferred compositions, such blends are treated with urea and heated to temperatures of about 320° F. under pressures of from about 70–95 lbs./sq. in. or higher. Such pressures may be maintained autogeneously due to the ammonia formed from the urea. The ground polytetrafluoroethylene resin and other additives such as white lead and graphite may be introduced at any stage of the procedure.

Lubricating base oils may also be added at any time in various proportions sufficient to provide pipe thread dope compositions which are easily applicable by spreading on the pipe threads.

TABLE I.—COMPOSITION AND PROPERTIES OF EXPERIMENTAL PIPE DOPE

| | Composition No. | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Component, wt. percent: | | | | | | | | | | | | | | |
| A | 100 | 61 | 47 | 32 | 49 | 34 | 21 | 34 | 23 | 46 | | | | |
| B | | | | | | | | | | | 100 | 50 | 36 | 27 |
| C | | | 33 | 47 | 59 | | | | | | | 50 | | |
| D | | | | | | 27 | 34 | 39 | | | | | 36 | |
| E | | | | | | | | | 18 | 23 | 25 | | | 27 |
| F | | 6 | 6 | 9 | 24 | 32 | 40 | 48 | 54 | 29 | | | 28 | 46 |
| ASTM-penetration, D217: | | | | | | | | | | | | | | |
| Worked | 318 | 341 | 334 | 339 | 350 | 346 | 341 | 369 | 343 | 335 | 500 | 335 | 318 | 332 |
| Unworked (aged 24 hrs.) | 290 | 307 | 308 | 315 | 332 | 324 | 332 | 336 | 324 | 348 | 428 | 332 | 322 | 326 |

The preceding Table I summarizes the preparation of a number of pipe thread dope compositions for testing and evaluation of sealing and lubricating properties.

In the above table, Component A is a lubricant base prepared in accordance with Example 3. Component B is Component A containing 3 to 7% while lead and 25–30% graphite. Component C is ground polytetrafluoroethylene resin (Teflon F-605 Grade 000, obtained from John L. Dore Company, Houston, Tex.). Component D is a finer grade of ground polytetrafluoroethylene resin having an average particle diameter of about 0.006 inch (Teflon 1 obtained from Du Pont). Component E is a still finer ground polytetrafluoroethylene resin having an average particle size diameter of about 1 micron (Teflon 6C obtained from Du Pont). Component F is solvent refined California paraffinic base lubricating oil having a viscosity at 100° F. to 360 SSU and a viscosity at 210° F. of 21 SSU.

The above compositions were tested for operational properties as pipe thread sealants. For the purpose of comparison, there was included Composition "0," which is a commercial thread sealant sold as "API High Pressure Silicone Compound BUL 5A2."

provides pipe thread dope compositions having generally good properties. On the other hand, the corresponding pipe thread dope compositions containing Component E, which is a more finely ground polytetrafluoroethylene resin, result in unsatisfactory storage stability.

The above compositions were evaluated as pipe thread dopes in a series of tests. In these tests, two pieces of tubing threaded at one end and plugged at the other were connected by a conventional API coupling rated for high pressures. The tubing had an outside diameter of 3.09 inches and a wall thickness of 0.55 inch. The threads were 2½" API No. 8 round. The couplings employed were of two general types: the API Grade N-80 couplings reinforced by pressing a sleeve over the outside to accommodate pressures up to 15,000 lbs./sq. in., and the API Grade P-105 couplings specifically designed for pressures up to 15,000 lbs./sq. in. without reinforcement. In the tests, the two pieces of tubing and coupling are made up using the same pipe thread dope in both threads. The joints are made up by machinery. The torque and the number of turns to achieve the desired torque were recorded. The vessels were then

TABLE II.—OPERATIONAL PROPERTIES OF EXPERIMENTAL THREAD SEALANTS

| | Composition No. | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| Composition, weight percent: | | | | | | | | | | | | | | | |
| Component A | (**) | 100 | 61 | 47 | 32 | 49 | 34 | 21 | 34 | 23 | 46 | | | | |
| Component B | (**) | | | | | | | | | | | 100 | 50 | 36 | 27 |
| Component C | (**) | | | 33 | 47 | 59 | | | | | | | 50 | | |
| Component D | (**) | | | | | | 27 | 34 | 39 | | | | | 36 | |
| Component E | (**) | | | | | | | | | 18 | 23 | 25 | | | 27 |
| Component F | (**) | | 6 | 6 | 9 | 24 | 32 | 40 | 48 | 54 | 29 | | | 28 | 46 |
| Shelf behavior, after 6 weeks: | | | | | | | | | | | | | | | |
| Expansion, percent | 0 | 0 | 0 | 0 | 0 | 0 | 0 | 0 | 0 | 8 | 8 | 0 | 0 | 0 | 0 |
| Contraction, percent | 0 | 0 | 0 | 0 | 0 | 0 | 0 | 0 | 0 | 0 | 0 | 10 | 2 | 0 | 0 |
| Oil separation | No | No | No | No | No | No | No | No | No | Yes | Yes | Yes | No | No | Yes | Yes |
| Application on threads: | | | | | | | | | | | | | | | |
| Spreading | G | G | G | G | G | F | G | | F | P | | P | G | G | G | G |
| Adherence | G | G | G | G | G | F | G | | F | P | | P | G | G | G | G |
| Feels tacky | X | X | X | X | X | | | | | | | | X | X | X | X |
| Feels neutral | | | | | | X | X | X | X | | | | | | | |
| Feels rubbery | | | | | | | | | X | X | X | | | | | |
| Thread make-up: | | | | | | | | | | | | | | | |
| Smooth | | X | X | X | X | X | | X | X | | X | X | | | | X |
| Jerky | X | | | | | | | | | | | | X | X | | |
| Disassembly of threads: | | | | | | | | | | | | | | | |
| Smooth | | X | X | X | X | X | | X | X | | X | X | | | | |
| Jerky | X | | | | | | | | | | | | X | | X | |
| Very jerky, needs excessive torque | | | | | | | | | | | | | | | X | |
| Preservation of threads: | | | | | | | | | | | | | | | |
| Good | | X | X | X | X | X | | X | X | | X | X | | | | X |
| Galling | | | | | | | | | | | | | X | X | | |
| Not used for leak tests | | | | | | | | X[1] | | | X[1] | | | | | |

[1] Compounds not tested because of the inferior performance of similar compositions (Nos. 7 and 10).
** API High pressure silicone compound BUL 5A2.
Symbols: G=good; F=fair; P=poor.

From the above table it is seen that Component A, the base lubricant composition, possesses excellent operational properties, while Component B, containing white leaded graphite, performs well in every aspect although there may be some storage instability. The addition of Component C in accordance with the present invention filled with a conventional mineral white oil of the type employed in pressure instruments, and were pressurized in increments of 1,000 lbs. sq. in. The maximum allowable pressure in the test apparatus was 15,000 lbs./sq. in. All the tests were carried out at ambient temperatures of 70–76° F.

TABLE III.—RESULTS OF MAIN THREAD SEALANT TESTS

| Test No.: | Coupling | Make-Up Torque, ft.-lb. | Make-Up No. of turns | Composition no. | Pressure, lbs. per sq. inch | Remarks |
|---|---|---|---|---|---|---|
| 1 | N-80 | 500 | 1.5 | 0 | 4,000 | Leaks at pressure indicated. |
| 2 | N-80 | 500 | 0.7 | 0 | 4,000 | Do. |
| 3 | P-105 | 500 | 0.8 | 0 | 5,000 | Do. |
| 4 | N-80 | 500 | 1.0 | 0 | 8,000 | Do. |
| 5 | P-105 | 500 | 1.0 | 0 | 10,000 | Do. |
| 6 | P-105 | 750 | 0.8 | 0 | 8,000 | Do. |
| 7 | P-105 | 1,000 | 1.1 | 0 | 14,000 | Do. |
| 8 | P-105 | 1,000 | 0.8 | 0 | 10,000 | Do. |
| 9 | N-80 | 500 | 0.4 | 1 | 1,000 | Do. |
| 10 | N-80 | 500 | 0.8 | 11 | 7,000 | Do. |
| 11 | N-80 | 500 | 0.8 | 8 | 2,000 | Do. |
| 12 | N-80 | 500 | 0.5 | 10 | 1,000 | Do. |
| 13 | N-80 | 500 | 0.6 | 14 | 3,000 | Do. |
| 14 | N-80 | 500 | 0.8 | 5 | 9,000 | Do. |
| 15 | N-80 | 500 | 1.0 | 7 | 14,000 | Do. |
| 16 | N-80 | 500 | 1.9 | 13 | 15,000 | Jerky make-up, needs excessive break-out torque. |
| 17 | N-80 | 500 | 1.7 | 2 | 15,000 | First cycle tight, but following cycles ooze. |
| 18 | N-80 | 500 | 1.9 | 2 | 15,000 | First cycle oozing, but following cycles tight. |
| 19 | N-80 | 500 | 1.8 | 2 | 15,000 | Tight. |
| 20 | N-80 | 500 | 2.0 | 3 | 15,000 | Do. |
| 21 | N-80 | 500 | 2.0 | 3 | 15,000 | Do. |
| 22 | N-80 | 500 | 2.0 | 3 | 15,000 | Do. |
| 23 | N-80 | 500 | 1.9 | 3 | 15,000 | Do. |
| 24 | P-105 | 500 | 1.9 | 3 | 15,000 | Do. |
| 25 | P-105 | 750 | 3.3 | 3 | 15,000 | First cycle tight, but following cycles show creeping extrusion of sealant. |
| 26 | N-80 | 500 | 2.1 | 4 | 15,000 | Tight. |
| 27 | N-80 | 500 | 2.1 | 12 | 15,000 | Do. |
| 28 | N-80 | 500 | 2.3 | 12 | 15,000 | Do. |

The above tests show that the pipe thread dope compositions of the invention possess excellent sealing and lubricating properties which are superior to other high pressure thread sealant compositions.

Further tests have been carried out illustrating the effectiveness of the compositions of the invention. In the tests, conventional 2⅜" diameter tubing having "tube and collar" type connections with No. 8 round threads were employed. All threads were cleaned and dried before the application of the various dopes tested. The threads were cut slightly with a file to provide a duplicatable, uniform leakage basis in each of the tests. The same make-up torque was applied for each test. The pressure was applied and reapplied for each test in an attempt to make the joints leak. The results of these tests are summarized in the following Table IV.

TABLE IV

| Test No. | Composition | Pressure, lbs. per sq. inch |
|---|---|---|
| 1 | Clean and dry | 1,900 |
| 2 | White lead | 5,500 |
| 3 | Weco API high-pressure | 8,400 |
| 4 | 1.125 pints Component A plus 164 g. Component C | 9,200 |
| 5 | 1.125 pints Component A plus 329 g. Component C | 10,600 |
| 6 | 1.125 pints Component A plus 658 g. Component C | 13,000 |
| 7 | 8 oz. No. 6 plus 30 cc. SAE 20 mineral lubricating oil | 15,000 |
| 8 | 1 part SAE 50 mineral oil plus 1.5 parts Component C | 12,000+ |

As indicated above, excellent high pressure seals are obtained with the pipe thread dope compositions of this invention. The Weco API grade included for comparison is described in "API Bulletin On Thread Compounds," American Petroleum Institute, New York, N.Y., 1960, and contains a silicone fluid base lubricant.

Still other tests were carried out using the procedure outlined in connection with Table III above. In these tests, the pipe thread dope compositions of the present invention were compared with a mechanical seal; namely, a Teflon ring embedded in a circumferential groove in the threads of the coupling. The pipe thread dope composition of the present invention had the distinct advantage of being spreadable in the field "on the spot," whereas the Teflon ring required factory fabrication. In the tests at pressures up to 15,000 lbs./sq. in., the pipe thread dope of the invention did not leak, whereas the coupling containing Teflon sealing rings exhibited slight leakage.

As already mentioned, the present invention is also directed to high pressure pipe thread joints comprising two mating threaded elements having dispersed therebetween a high pressure seal consisting essentially of the present pipe thread dope composition. Such joints are suitable for extremely high pressures. Generally described, they consist of a male and female threaded element which, when made up with the pipe thread dope composition using appropriate torque, are found to coact to provide an effectively sealed high pressure pipe joint. An assembly illustrating various types of pipe joints is shown in the accompanying drawing. It will be noted in this drawing that the threads of the coupling may be of the V type or the rounded, square or other modified types. Lubricated sleeves and liners may also be doped with the composition of the invention.

Referring in more detail to the drawing, the pipe thread dope is employed in combination with joints such as male threaded component 1 and female threaded component 2 between typical high friction API standard righthand threads 3. Other components employing compositions of the invention may be engaged through low friction threads as illustrated by lefthand thread 4. Still other high friction threads are illustrated by the "Acme" high friction righthand thread 5 and medium friction "Hydril" type righthand thread 6. The compositions are also used conjointly with sleeves or pressed fittings as illustrated by component 7 in the drawing.

While the character of this invention has been described in detail with numerous examples, this has been done by way of illustration only and without limitation of the invention. It will be apparent to those skilled in the art that numerous modifications and variations of the illustrative examples may be made in the practice of the invention within the scope of the following claims.

I claim:

1. An improved high pressure pipe thread sealant consisting essentially of from about 33 to 80% by weight of ground polytetrafluoroethylene resins of an average particle diameter of from about 0.005 to 0.05", 0.5 to 10 weight percent of a calcium salt of a fatty acid of from 10 to 22 carbon atoms, from about 1 to 10 weight percent of the combination of calcium acetate and calcium carbonate wherein the weight ratio of calcium carbonate to calcium acetate is in the range of 3:1 to 1:1 and from about 0.1 to 5% by weight of base expressed as calcium hydroxide, the remainder being mineral oil of lubricating viscosity, said sealant being easily spreadable on pipe threads and providing effective seals against pressures of at least 15,000 pounds per square inch.

2. A sealant according to claim 1 wherein the calcium salt of a fatty acid is calcium 12-hydroxy-stearate.

3. A composition according to claim 1 having from about 25 to 30 weight percent of graphite.

4. A composition according to claim 1 having 3 to 7% by weight of white lead.

References Cited

UNITED STATES PATENTS

| | | | |
|---|---|---|---|
| 2,510,112 | 6/1950 | Holbrook | 252—58 X |
| 2,827,313 | 3/1958 | Conner | 285—355 X |
| 3,002,770 | 10/1961 | Chestnut et al. | 285—94 |
| 3,011,975 | 12/1961 | Nitzsche et al. | 252—58 X |
| 3,069,387 | 12/1962 | Allen et al. | 252—58 X |
| 3,159,577 | 12/1964 | Ambrose et al. | 252—58 X |
| 3,186,944 | 6/1965 | Dreher. | |
| 3,189,543 | 6/1965 | Griddle | 252—18 |
| 3,189,944 | 1/1965 | Dreher | 252—18 |

FOREIGN PATENTS

| | | |
|---|---|---|
| 664,546 | 1/1952 | Great Britain. |
| 832,163 | 4/1960 | Great Britain. |

DANIEL E. WYMAN, Primary Examiner

I. VAUGHN, Assistant Examiner

U.S. Cl. X.R.

252—18, 25, 58